(12) United States Patent
Zamel

(10) Patent No.: US 10,247,907 B2
(45) Date of Patent: Apr. 2, 2019

(54) MIRROR MOUNTING ASSEMBLY

(71) Applicant: Northrop Grumman Systems Corporation, Falls Church, VA (US)

(72) Inventor: James M. Zamel, Rolling Hills Estates, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 77 days.

(21) Appl. No.: 15/164,121

(22) Filed: May 25, 2016

(65) Prior Publication Data

US 2017/0343771 A1 Nov. 30, 2017

(51) Int. Cl.
| | |
|---|---|
| A47G 1/02 | (2006.01) |
| A47G 1/16 | (2006.01) |
| G02B 7/18 | (2006.01) |
| G02B 7/183 | (2006.01) |

(52) U.S. Cl.
CPC ............. *G02B 7/181* (2013.01); *A47G 1/02* (2013.01); *A47G 1/16* (2013.01); *G02B 7/183* (2013.01)

(58) Field of Classification Search
CPC .......... G02B 7/182; G02B 7/183; G02B 5/08; G02B 7/181; A47G 1/02; A47G 1/00; A47G 1/16; A47G 1/0605; A47G 1/065
USPC ........................................ 359/848, 846, 871
See application file for complete search history.

(56) References Cited

U.S. PATENT DOCUMENTS

| | | | | |
|---|---|---|---|---|
| 3,507,737 A | * | 4/1970 | Busdiecker | ............. B32B 27/00 |
| | | | | 428/120 |
| 4,060,315 A | * | 11/1977 | Heinz | ..................... F16C 11/12 |
| | | | | 248/487 |
| 4,157,802 A | | 6/1979 | May, Jr. | |
| 4,373,783 A | | 2/1983 | Anderson | |
| 6,217,178 B1 | * | 4/2001 | Drumheller | ............ F24J 2/1057 |
| | | | | 359/849 |
| 6,796,666 B1 | | 9/2004 | Cook et al. | |

(Continued)

FOREIGN PATENT DOCUMENTS

| | | |
|---|---|---|
| DE | 102010060091 | 4/2012 |
| GB | 1268048 | 3/1972 |

(Continued)

OTHER PUBLICATIONS

"Area," Merriam Webster, <https://www.merriam-webster.com/dictionary/area>, Sep. 21, 2017.*

(Continued)

*Primary Examiner* — Jade R Chwasz

(74) *Attorney, Agent, or Firm* — McCracken & Gillen LLC

(57) ABSTRACT

An exemplary support structure for a planar faceplate includes ribs extending substantially perpendicular to a bottom surface of the planar faceplate. Spaced apart projections extend from the ribs towards the bottom surface of the planar faceplate and have distal ends that engage and are secured to the bottom surface. Each distal end defines an area with a numerical value that is less than the thickness of the planar faceplate measured in the same measurement units as the area to limit any stress formations induced in the planar faceplate due to thermal changes from reaching a top surface of the planar faceplate. Alternatively, the projections may be spaced apart mesas extending outward from a rigid material.

18 Claims, 2 Drawing Sheets

(56) References Cited

U.S. PATENT DOCUMENTS 7,145,739 B1 12/2006 Bly
7,832,880 B2 11/2010 Craig
8,871,338 B2 10/2014 Spadaccini et al.

FOREIGN PATENT DOCUMENTS

JP 2016080906 5/2016
WO WO-2016026888 A1 * 2/2016 ......... G03F 7/70883

OTHER PUBLICATIONS

Cho, M.K. et al; Optimization of support point locations and force levels of the primary mirror support system; Gemini 8-M Telescopes Project, RPT-O-G0017 (1993).
Brodhacker, K. L. et al; Spin-cast polymer mirrors; Amateur Astronomy 71 (2011); 21 pages.
Rey, J. J. et al; A deployable, annular, 30m telescope, space-based observatory; In SPIE Astronomical Telescopes+Instrumentation, pp. 1-14; International Society for Optics and Photonics, 2014.

* cited by examiner

MIRROR MOUNTING ASSEMBLY

BACKGROUND

This invention relates to relatively large mirrors, or other surfaces requiring no surface disruptions, and more specifically to the structure that supports the back of the mirror or surface.

The lack of discontinuities and/or irregularities on the reflecting face of mirrors (or other surfaces) are generally desired and are of critical importance where a relatively large mirror is used in a scientific instrument, e.g. a telescope or other optical device. Some irregularities in the reflecting face of the mirror may be caused by physical stresses induced by the mirror mounting structure, e.g. dimensional changes of the mirror mounting structure with temperature variation or due to drying of an adhesive. This effect is an increasing concern where the thickness of the mirror faceplate is relatively thin which may be desirable in some environments such as to minimize weight.

Some larger mirror faceplates have been supported on the back side by elongated ribs where each rib continuously engages and, with the use of an adhesive, serves as a support structure for the mirror faceplate. Spaced apart ribs are generally an improvement over mounting the mirror faceplate to a planar sheet of material in terms of reducing physical stresses induced in the mirror faceplate. However, there exists a need for an improved mounting structure for such mirrors that further minimizes discontinuities/irregularities in the reflecting face of the mirror due to such stresses.

SUMMARY

It is an object of the present invention to satisfy this need. An exemplary support structure for a planar faceplate includes ribs extending substantially perpendicular to a bottom surface of the planar faceplate. Spaced apart projections extend from the ribs towards the bottom surface of the planar faceplate and have distal ends that engage and are secured to the bottom surface. Each distal end defines an area with a numerical value that is less than the thickness of the planar faceplate measured in the same measurement units as the area to limit any stress formations induced in the planar faceplate due to thermal changes from reaching a top surface of the planar faceplate. Alternatively, the projections may be spaced apart mesas extending outward from a rigid material.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of how stresses induced in a mirror faceplate can be better mitigated by managing the area of supports that engage the back of the faceplate versus the thickness of the faceplate.

Figure 1:
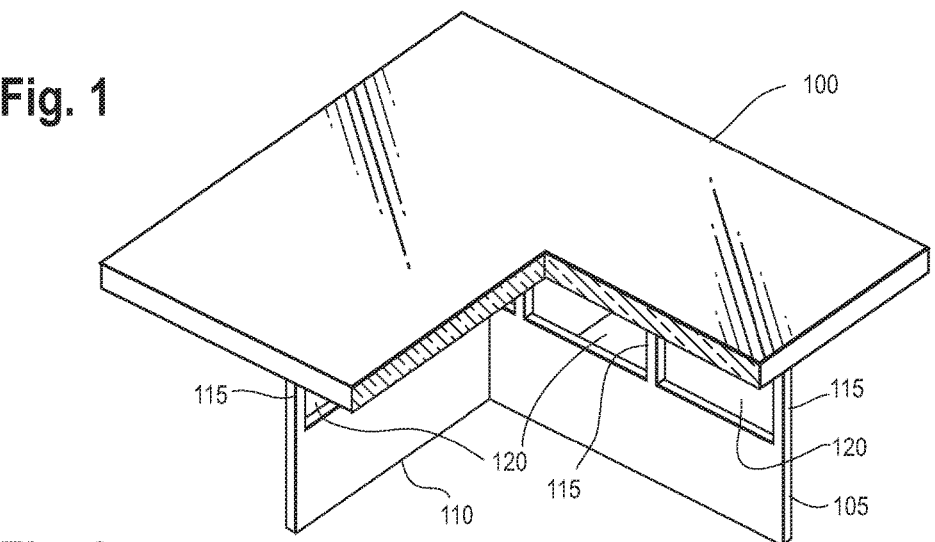
FIG. 1 is a perspective view showing an exemplary embodiment of a mirror assembly in accordance with the present invention.
Figure 2:
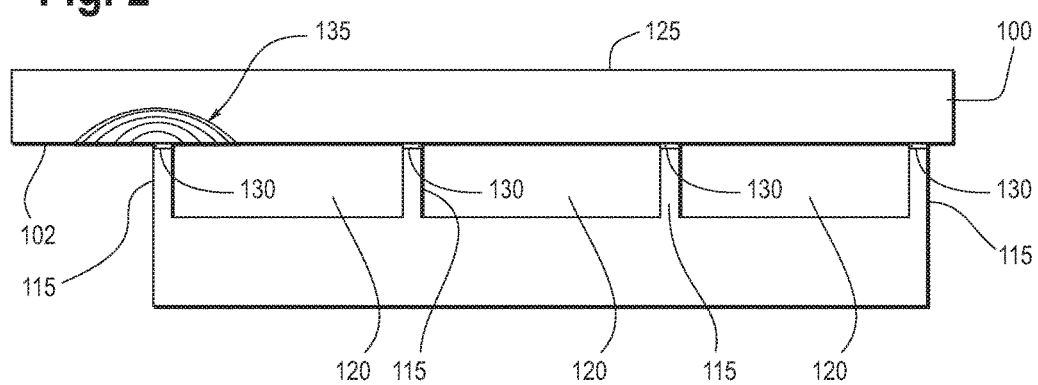
FIG. 2 is a partial side view showing the exemplary embodiment of FIG. 1.

Referring to FIGS. 1 and 2, a mirror faceplate 100 is mounted to and supported by ribs 105 and 110. The ribs may be formed from planar sheets of material or a block of material may be formed to have a repeating series of parallel peaks and valleys where the peaks function as relatively narrow support ridges. In this example, the mirror faceplate 100 consists of a planar sheet of material having a reflective surface 125 and the ribs 105 and 110 comprise sheets of material, e.g. carbon fiber, disposed transverse to the bottom surface 102 of the mirror faceplate 100. A plurality of cutouts 120, i.e. areas where no rib material is present, are spaced apart along the edge of ribs 105 and 110 disposed adjacent the bottom surface 102 of the mirror faceplate 100 leaving a corresponding spaced apart number of projections 115 of the rib material that engages the bottom surface 102 of the mirror faceplate 100. The ribs may be manufactured with corresponding cutouts and projections, or alternatively a rib with a solid edge portion can be machined to remove the material in the cutout area. In this exemplary embodiment, an adhesive 130 is disposed on the distal ends of the projections 115 to secure the bottom surface 102 of the mirror faceplate 100 to the ribs 105 and 110 via the respective spaced apart projections 115. Any adhesive 130 compatible with the materials being joined could be used, although adhesives with a similar coefficient of thermal expansion to the materials being joined are preferred.

In order to minimize "print through", i.e. a stress-induced physical deformation extending through the mirror faceplate and reaching the reflective face 125 of the mirror, along the lines of attachment of the ribs to the bottom surface 102 of the mirror faceplate 100, it is preferred that the area of the distal ends of projections 115 that engage and support the bottom surface 102 of the mirror faceplate 100 be less than twice the thickness of the mirror faceplate 100. The distal ends have an area with a numerical value that is less than twice the thickness of the planar faceplate measured in the same measurement units as the area. For example, for a mirror faceplate 100 with thickness of 0.1 inches, the area of the distal end of each projection 115 should be less than 0.2 square inches, and preferably be less than 0.1 square inches. A representative stress formation 135 is shown in the mirror faceplate 100 about one of the projections 115. Of course, corresponding stress formations will likely occur where each of the projections 115 engage the bottom surface 102 of the mirror faceplate 100. It should be noted that although the stress formation 135 extends upwardly into the mirror faceplate 100 from the bottom surface 102 of the mirror faceplate, the maximum extent of the stress formation 135 does not reach the reflective surface 125 and hence does not adversely impact the smoothness of the reflective surface, i.e. reflections are from reflective surface 125 are not distorted by such stress formations. The number and location of ribs needed will vary depending of the required stability of the mirror faceplate.

Figure 3:
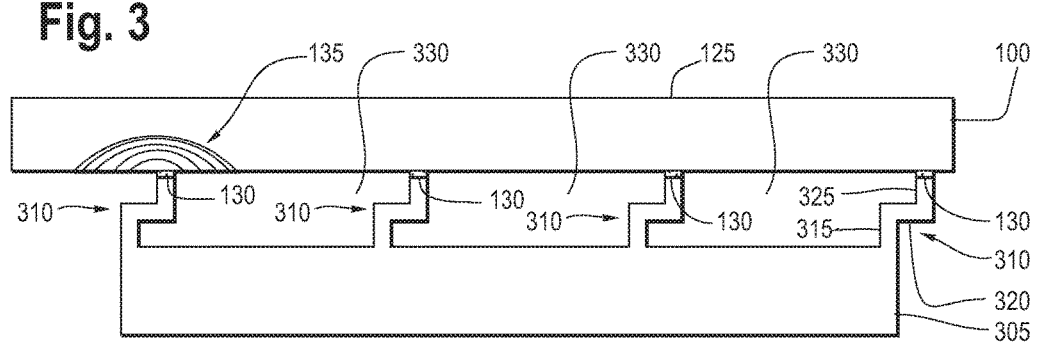
FIG. 3 is a partial side view showing another exemplary embodiment of a mirror support structure in accordance with the present invention.

FIG. 3 shows a partial side view of another exemplary embodiment of mirror faceplate 100 and supporting rib 305. In this example, rib 305 has a plurality of spaced apart projections 310 having a first perpendicular (relative to the bottom surface 102 of mirror faceplate 100) leg 315 connected to a substantially parallel leg 320 that is connected to another perpendicular leg 325 having a distal end that engages and is affixed with adhesive 130 to the bottom surface 102. A plurality of cutouts 330 are spaced apart along the edge of ribs 305 defined between adjacent projections 310. Similar to the above described embodiment, it is preferred that the area of the distal ends of legs 325 that engage and support the bottom surface 102 of the mirror faceplate 100 be less than the thickness of the mirror faceplate 100. The projections 310 of the embodiment of FIG. 3 provide reduced sensitivity to thermal changes since the dimensions of the legs of the projections 310 are selected to accommodate physical movement/bending themselves in response to dimensional forces associated with thermal changes. The flexibility of leg 320 to allow legs 315 and 325 to move up/down as well as accommodating laterally movement (in and out the page as seen in FIG. 3) of these legs due to forces caused by thermal changes further reduces the magnitude of the stress formation 135. Legs 310 may be formed in a pseudo-random pattern so that the respective legs 320 lie within a plane generally parallel to the area of the mirror faceplate 100 to which each is attached but with respective legs 320 rotated to form different angles to each other. This will assist in opposing deflection of a curved mirror faceplate such as due to external forces such as gravity. Lateral movement of a curved mirror faceplate such as used for a telescope is also undesirable.

Other types of nonlinear projections in addition to projections 310 could be utilized to accommodate movement in the projections themselves to minimize the magnitude of the induced stress formations in the mirror faceplate. For example, projections having a general "S" or "C" shape could be used.

Figure 4:
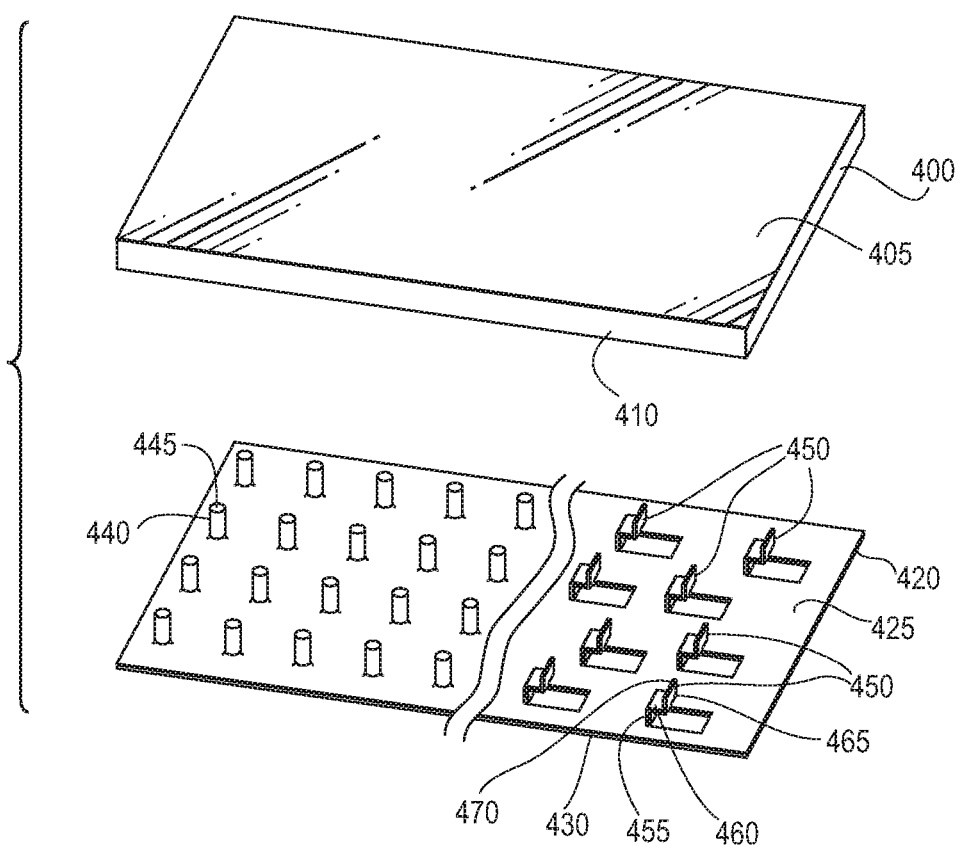
FIG. 4 is a perspective view showing a further exemplary embodiment of a mirror assembly in accordance with the present invention.

FIG. 4 shows another embodiment of a support structure for a planar mirror faceplate 400 having a top reflecting surface 405 and a bottom surface 410. A sheet of a rigid supporting material 420 is generally planar and has a top surface 425 and a bottom surface 430. Two different types of supporting mesas that project away from the top surface 425 are illustrated.

A mesa 440 may have a generally cylindrical or rectangular cross-section and extend outwardly from the top surface 425 of the support material 420. The distal end 445 of mesa 440 is substantially parallel to the top surface 425 and has an area less than the thickness of the mirror faceplate 400. All of the mesas 440 will have a similar height so that each of the distal ends lies within a single plane so that each will contact and be adhered to the bottom surface 410 of the mirror faceplate 400. The mesas 440 may be aligned in rows along the top surface 425. Alternatively, the mesas 440 may be arranged in a pseudorandom pattern to eliminate a linear pattern of attachment to the mirror faceplate 400.

Another type of mesa 450 may be utilized which also projects outwardly from the top surface 425 of the support material 420. The mesas 450 are generally similar to the projections 310 as previously explained. Each mesa 450 includes a first leg 455 attached to and projecting substantially perpendicular to the top surface 425. Another leg 460 has an end that attaches to the distal end of leg 455 and extends substantially parallel to the top surface 425. The other end of leg 460 attaches to one end of leg 465 that projects substantially perpendicular to the top surface 425. The distal end 470 of leg 465 is parallel to the top surface 425 and has an area less than the thickness of the mirror faceplate 400. The mesas 450 each have a distal end that lies within a single plane that will engage and be adhered to the bottom surface 410 of the mirror faceplate 400. Similar to mesas 440, mesas 450 may be aligned in rows along the top surface 425 or alternatively may be arranged in a pseudo-random pattern to eliminate a linear pattern of attachment to the mirror faceplate 400. Only one type of mesas 440 and 450 may be utilized on a single rigid supporting material 420. Alternatively, both types of mesas 440 and 450 may be utilized in an intermingled and dispersed pattern to achieve a blend of strength as provided by mesas 440 and flexibility as provided by mesas 450.

Although exemplary implementations of the invention have been depicted and described in detail herein, it will be apparent to those skilled in the art that various modifications, additions, substitutions, and the like can be made without departing from the spirit of the invention. The scope of the invention is defined in the following claims.

The invention claimed is:

1. A support structure for a planar faceplate comprising:
ribs extending substantially perpendicular to a bottom surface of the planar faceplate where the faceplace has a thickness of X inches, where thickness of the faceplate is measured in a dimension perpendicular to the bottom surface;
spaced apart projections extending outward from the ribs, each of the spaced apart projections having a distal end that lies within a single plane for engaging and being secured to the bottom surface;
each distal end having an area of R square inches where an entirety of the area of each distal end engages the bottom surface, where R is less than two times X to limit any stress formations induced at the bottom of the planar faceplate due to thermal changes from reaching a top surface of the planar faceplate where the spaced apart projections are opposite to the top surface of the planar faceplace.

2. The support structure of claim 1 wherein R is less than X.

3. The support structure of claim 1 wherein at least some of the spaced apart projections have a nonlinear portion to accommodate physical deflection of the at least some of the spaced apart projections in order to minimize the stress formations.

4. The support structure of claim 3 wherein the nonlinear portion includes first and second legs perpendicular to the bottom surface and a third leg parallel to the bottom surface, the first leg extending from the rib and having a first distal end, the third leg connects the first distal end to one end of the second leg with the other end of the second leg engaging the bottom surface.

5. The support structure of claim 3 wherein the nonlinear portion of the spaced apart projections comprises a first section of the spaced apart projections that is substantially parallel to the bottom surface of the planar faceplate, at least one other section of the spaced apart projections being substantially perpendicular to the bottom surface of the planar faceplate.

6. The support structure of claim 3 wherein the nonlinear portion of the spaced apart projections provide flexibility allowing the spaced apart projections to move up and down relative to the planar faceplate as well as accommodating laterally movement parallel to the planar faceplate.

7. The support structure of claim 1 wherein the planar faceplate is a mirror faceplate having a top reflecting planar surface.

8. The support structure of claim 1 further comprising an adhesive having a similar coefficient of thermal expansion to the spaced apart projections, the adhesive bonding the distal ends of the spaced apart projections to the bottom surface of the planar faceplate.

9. A support structure for a planar faceplate comprising:
a rigid material extending substantially parallel to a bottom surface of the planar faceplate;

spaced apart mesas extending outward from the rigid material, each of the spaced apart mesas having a distal end that engages and is secured to the bottom surface;

each distal end having an area of R square inches where an entirety of the area engages the bottom surface and the planar faceplate having a thickness of X inches, where the thickness of the faceplate is measured in a dimension perpendicular to the bottom surface, where R is less than two times X to limit any stress formations induced in the planar faceplate due to thermal changes at the distal end engagement with the bottom surface from reaching a top surface of the planar faceplate that is opposite to the spaced apart mesas.

10. The support structure of claim 9 wherein R is less than X.

11. The support structure of claim 9 wherein at least some of the spaced apart mesas have a nonlinear portion to accommodate physical deflection of the at least some of the spaced apart mesas in order to minimize the stress formations.

12. The support structure of claim 11 wherein the nonlinear portion includes first and second legs perpendicular to the bottom surface and a third leg parallel to the bottom surface, the first leg extending from the rigid material and having a first distal end, the third leg connects the first distal end to one end of the second leg with the other end of the second leg engaging the bottom surface.

13. The support structure of claim 9 wherein the planar faceplate is a mirror faceplate having a top reflecting planar surface.

14. A mirror assembly comprising:
a faceplate having a thickness of X inches and containing a top reflecting surface and a bottom surface, where thickness of the faceplate is measured in a dimension perpendicular to the bottom surface;
a support structure;
spaced apart mesas extending outward from the support structure, each of the spaced apart mesas having a distal end that engages and is secured to the bottom surface;
each distal end having an area of R square inches where R is less than two times X to limit any stress formations induced in the faceplate due to thermal changes at the distal ends engagement with the bottom surface from reaching the top reflecting surface that is opposite to the spaced apart mesas.

15. The mirror assembly of claim 14 wherein R is less than X.

16. The mirror assembly of claim 14 wherein at least some of the spaced apart mesas have a nonlinear portion to accommodate physical deflection of the at least some of the spaced apart mesas in order to minimize the stress formations.

17. The mirror assembly of claim 16 wherein the nonlinear portion includes first and second legs perpendicular to the bottom surface and a third leg parallel to the bottom surface, the first leg extending from the mirror assembly and having a first distal end, the third leg connects the first distal end to one end of the second leg with the other end of the second leg engaging the bottom surface.

18. The mirror assembly of claim 14 wherein the top reflecting surface of the faceplate is planar.

* * * * *